US009804979B2

(12) United States Patent
Sinclair

(10) Patent No.: US 9,804,979 B2
(45) Date of Patent: Oct. 31, 2017

(54) RING BUS ARCHITECTURE FOR USE IN A MEMORY MODULE

(71) Applicant: SanDisk Technologies Inc., Plano, TX (US)

(72) Inventor: Alan Welsh Sinclair, Falkirk (GB)

(73) Assignee: SanDisk Technologies LLC, Plano, TX (US)

( * ) Notice: Subject to any disclaimer, the term of this patent is extended or adjusted under 35 U.S.C. 154(b) by 303 days.

(21) Appl. No.: 14/584,358

(22) Filed: Dec. 29, 2014

(65) Prior Publication Data

US 2016/0188502 A1 Jun. 30, 2016

(51) Int. Cl.

| | |
|---|---|
| ***H05K 7/10*** | (2006.01) |
| ***G06F 13/16*** | (2006.01) |
| ***G06F 12/02*** | (2006.01) |
| ***G06F 13/28*** | (2006.01) |
| ***G06F 13/40*** | (2006.01) |
| ***G06F 13/42*** | (2006.01) |

(52) U.S. Cl.

CPC ...... *G06F 13/1684* (2013.01); *G06F 12/0246* (2013.01); *G06F 13/287* (2013.01); *G06F 13/4068* (2013.01); *G06F 13/4282* (2013.01); *G06F 2212/7201* (2013.01); *Y02B 60/1228* (2013.01); *Y02B 60/1235* (2013.01)

(58) Field of Classification Search

None

See application file for complete search history.

(56) References Cited

U.S. PATENT DOCUMENTS

| | | | | |
|---|---|---|---|---|
| 6,728,206 B1 * | 4/2004 | Carlson | H04L 12/427 | 370/222 |
| 7,343,442 B2 * | 3/2008 | Rankin | G06F 13/4027 | 710/310 |
| 8,824,603 B1 * | 9/2014 | Ge | H04B 7/0413 | 370/464 |
| 2002/0091865 A1 * | 7/2002 | Parady | H04L 12/4637 | 709/251 |
| 2008/0104378 A1 * | 5/2008 | Huang | G06F 9/4403 | 713/1 |
| 2009/0024819 A1 * | 1/2009 | Fisher | G06F 12/0897 | 711/170 |
| 2010/0251005 A1 * | 9/2010 | Kitano | G06F 11/2005 | 714/3 |
| 2013/0061003 A1 * | 3/2013 | Millet | G06F 13/4022 | 711/141 |
| 2015/0089164 A1 * | 3/2015 | Ware | G11C 5/02 | 711/149 |

* cited by examiner

*Primary Examiner* — Elias Mamo

(74) *Attorney, Agent, or Firm* — Brinks Gilson & Lione

(57) ABSTRACT

Ring bus architectures for use in a memory module are disclosed. A memory module may include a ring bus controller and a bus bridge positioned on a primary ring bus. The memory module also includes a secondary ring bus in communication with the bus bridge and a plurality of non-volatile memory units. The ring bus controller is configured to send a configuration command to the bus bridge via the primary bus ring, where the configuration command includes an indication to route future commands and/or data to the secondary ring bus extending from the bus bridge. The bus bridge is configuration to, in response to the configuration command, configure the bus bridge to route future commands and/or data from the primary ring bus to the secondary ring bus.

20 Claims, 12 Drawing Sheets

1102 MONITOR DATA TRAFFIC ON PRIMARY AND SECONDARY RING BUSES
1104 GENERATE CONFIGURATION COMMAND
1106 COMMUNICATE CONFIGURATION COMMAND TO BUS BRIDGE
1108 BUS BRIDGE RECEIVES CONFIGURATION COMMAND
1110 BUS BRIDGE IS CONFIGURED BASED ON CONFIGURATION COMMAND
1112 BUS BRIDGE ROUTES COMMANDS AND/OR DATA FROM PRIMARY RING BUS TO SECONDARY RING BUS
1114 GENERATE SECOND CONFIGURATION COMMAND
1116 COMMUNICATE SECOND CONFIGURATION COMMAND TO BUS BRIDGE
1118 BUS BRIDGE RECEIVES SECOND CONFIGURATION COMMAND
1120 BUS BRIDGE IS CONFIGURED BASED ON SECOND CONFIGURATION COMMAND
1122 BUS BRIDGE CONTINUES TO ROUTE COMMANDS AND/OR DATA ON PRIMARY RING BUS, THEREBY BYPASSING SECONDARY RING BUS

| | EXAMPLE OPERATIONS | PRIMARY RING BUS | | BUS BRIDGE A | | SECONDARY RING BUS A | | BUS BRIDGE B | | SECONDARY RING BUS B | |
|---|---|---|---|---|---|---|---|---|---|---|---|
| | | SOURCE | DESTINATION | SOURCE | DESTINATION | SOURCE | DESTINATION | SOURCE | DESTINATION | SOURCE | DESTINATION |
| 1 | COMMAND FROM RING BUS CONTROLLER TO BUS BRIDGE B | RING BUS CONTROL LER | BUS BRIDGE B | - | - | - | - | - | - | - | - |
| 2 | COMMAND FROM RING BUS CONTROLLER TO NAND B1 | RING BUS CONTROL LER | BUS BRIDGE B | - | - | - | - | PRIMARY RING BUS | SECONDARY RING BUS B | BUS BRIDGE B | NAND B1 |
| 3 | COMMAND FROM RING BUS CONTROLLER TO NAND A1 | RING BUS CONTROL LER | BUS BRIDGE B | PRIMARY RING BUS | SECONDARY RING BUS A | BUS BRIDGE A | NAND A1 | PRIMARY RING BUS | PRIMARY RING BUS | - | - |
| 4 | WRITE DATA FROM HOST INTERFACE TO NAND B1 | HOST INTERFA CE | BUS BRIDGE B | - | - | - | - | PRIMARY RING BUS | SECONDARY RING BUS B | BUS BRIDGE B | NAND B1 |
| 5 | WRITE DATA FROM HOST INTERFACE TO NAND A1 | HOST INTERFA CE | BUS BRIDGE B | PRIMARY RING BUS | SECONDARY RING BUS A | BUS BRIDGE A | NAND A1 | PRIMARY RING BUS | PRIMARY RING BUS | - | - |
| 6 | READ DATA FROM NAND B1 TO HOST INTERFACE | BUS BRIDGE A | HOST INTERFAC E | PRIMARY RING BUS | PRIMARY RING BUS | - | - | SECONDARY RING BUS B | PRIMARY RING BUS | NAND B1 | BUS BRIDGE B |
| 7 | READ DATA FROM NAND A1 TO HOST INTERFACE | BUS BRIDGE A | HOST INTERFAC E | SECONDARY RING BUS A | PRIMARY RING BUS | NAND A1 | BUS BRIDGE A | - | - | - | - |
| 8 | COPY DATA FROM NAND A1 TO NAND A2 | - | - | - | - | NAND A1 | NAND A2 | - | - | - | - |
| 9 | COPY DATA FROM NAND A2 TO NAND A1 | - | - | SECONDARY RING BUS A | SECONDARY RING BUS A | NAND A2 | NAND A1 | - | - | - | - |
| 10 | COPY DATA FROM NAND A1 TO NAND B1 | BUS BRIDGE A | BUS BRIDGE B | SECONDARY RING BUS A | PRIMARY RING BUS | NAND A1 | BUS BRIDGE A | PRIMARY RING BUS | SECONDARY RING BUS B | BUS BRIDGE B | NAND B1 |

FIG. 10

RING BUS ARCHITECTURE FOR USE IN A MEMORY MODULE

BACKGROUND

Memory modules for use in devices such as servers, computers, tablet computers, cellular phones, and other handheld devices often utilize a controller and a non-volatile memory. Conventional controllers utilize a bus within the memory module to send data directly between the controller and the non-volatile memory or other components within the memory module such as an interface coupled with a host.

To increase the performance of controllers within memory modules, controllers have been designed that utilize ring bus architectures to communicate with non-volatile memory and other components within the memory modules. Examples of such controllers are disclosed in U.S. Pat. No. 8,375,146 assigned to SanDisk Technologies, Inc.

Enhancements to controllers utilizing ring bus architectures are desirable to further increase the performance of controllers within memory modules.

SUMMARY

In one aspect, a memory module is disclosed. The memory module includes a ring bus controller, first routing circuitry, and a first ring bus connected to the first routing circuitry. The memory module further includes a first plurality of non-volatile memory units, each non-volatile memory unit comprising a memory die, and a second ring bus connecting the first routing circuitry and each non-volatile memory unit of the first plurality of non-volatile memory units.

The first routing circuitry is configured to configure, based on a configuration command from the ring bus controller, the first routing circuitry to route a command and a first set of data on the first ring bus to the second ring bus.

The first routing circuitry is further configured to receive, after configuring the first routing circuitry based on the configuration command, the command and the first set of data on the first ring bus and to route the command and the first set of data to the second ring bus.

In another aspect, a method for managing data within a memory module is disclosed. In the method, a first bus bridge receives via a primary ring bus a configuration command. The configuration command comprises an indication for the first bus bridge to route a future command to a secondary bus ring extending from the first bus bridge.

The first bus bridge is configured, based on the configuration command, to route a command on a command line of the primary bus ring to a command line of the secondary bus ring extending from the first bus bridge and to route a first set of data on a data line of the primary bus ring to a data line of the secondary bus ring extending from the first bus bridge.

After receiving the configuration command, the first bus bridge receives a command on the command lines of the primary bus ring and routes the command to the command line of the secondary bus ring extending from the first bus bridge. Additionally, the first bus bridge receives a first set of data on the data line of the primary bus ring and routes the first set of data to the data line of the secondary bus ring extending from the first bus bridge.

In another aspect, another memory module is disclosed. The memory module includes a primary ring bus and a ring bus controller positioned on the primary ring bus.

The memory module further includes a secondary ring bus and a tertiary ring bus. The secondary ring bus is in communication with the primary ring bus via a first bus bridge. The tertiary ring bus is in communication with the secondary ring bus via a second bus bridge.

The ring bus controller is configured to direct the first bus bridge to route data between the primary ring bus and the secondary ring bus and is configured to direct the second bus bridge to route data between the secondary ring bus and the tertiary ring bus.

BRIEF DESCRIPTION OF THE DRAWINGS

FIG. 10 is a table defining, for the system topology of FIG. 9, a configuration of primary and secondary ring busses to support various operations;

DETAILED DESCRIPTION OF THE DRAWINGS

The present disclosure is directed to ring bus architectures for use in a memory module. The memory modules described below provide increased performance through the utilization of a primary ring bus and one or more secondary ring busses in communication with the primary ring bus via bus bridges (also referred to as routing circuitry).

As explained in more detail below, utilizing multiple ring busses in the memory module allows for concurrent data transfers between multiple source/destination pairs of a ring bus controller, memory units, and/or other components of the memory module such as a host interface, an encryption engine. Additionally, because data is directly transferred between adjacent nodes on the primary ring and/or secondary ring, the memory module is able to operate at high frequencies.

To assist in explaining a memory module utilizing ring bus architectures with a primary ring bus and one or more secondary ring busses, flash memory modules utilizing a conventional bus are described below in conjunction with FIG. 1.

Figure 1:
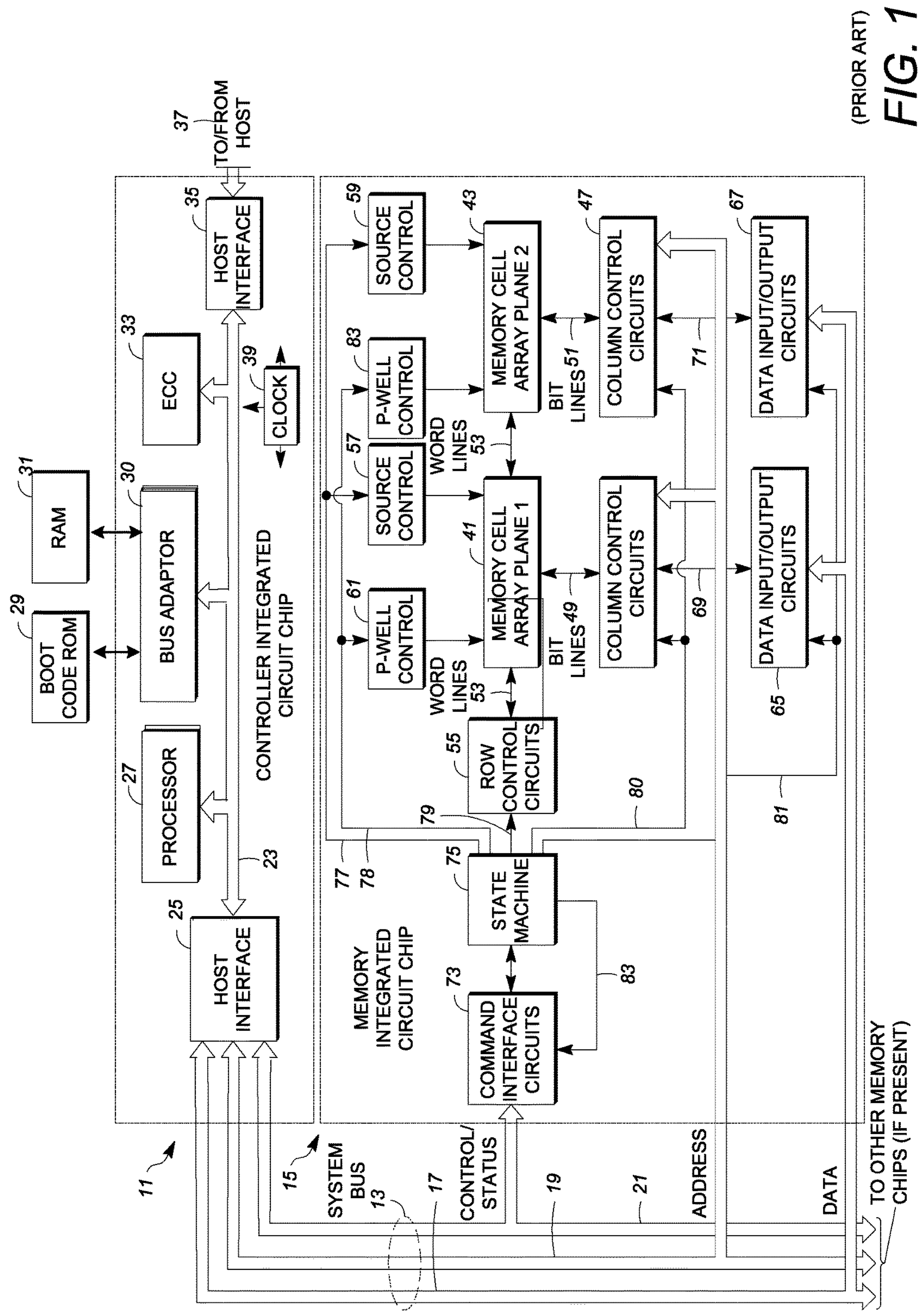
FIG. 1 is a block schematic diagram of a typical existing flash memory module that utilizes a conventional bus architecture.

FIG. 1 is a block diagram of a typical flash memory module with a conventional bus. The system controller is usually implemented on a single integrated circuit chip 11 that is connected in parallel with one or more integrated circuit memory chips over a system bus 13, a single such memory chip 15 being shown in FIG. 1. The particular bus 13 that is illustrated includes a separate set of conductors 17 to carry data, a set 19 for memory addresses and a set 21 for control and status signals. Alternatively, a single set of conductors may be time shared between these three functions.

A typical controller chip 11 has its own internal conventional bus 23 that interfaces with the system bus 13 through interface circuits 25. The primary functions normally connected to the bus are a processor 27 (such as a microprocessor or micro-controller); a read-only-memory (ROM) 29, external to the controller integrated circuit chip but in communication with bus 23 via a bus interface adaptor 30, that contains code to initialize ("boot") the system; random-access-memory (RAM) 31, external to the controller integrated circuit chip but in communication with bus 23 via the bus adaptor 30, used primarily to buffer data being transferred between the memory and a host; and circuits 33 that calculate and check an error correction code ("ECC") for data passing through the controller between the memory and the host.

Although illustrated in FIG. 1 as located external to the controller integrated circuit chip, in other implementations one or both of the ROM and the RAM may be located on the controller integrated circuit chip. Further, in some implementations, the system may include ROM and RAM internal to the controller integrated circuit chip as well as ROM and RAM that is external to the controller integrated circuit chip.

The controller bus 23 interfaces with a host system through circuits 35, which, in the case of the system of FIG. 1 being contained within a memory card, is done through external contacts 37 of the card. A clock 39 is connected with and utilized by each of the other components of the controller 11.

The memory chip 15, as well as any other connected with the system bus 13, typically contains an array of memory cells organized into multiple sub-arrays or planes, two such planes 41 and 43 being illustrated for simplicity but four or eight such planes are more typical. Alternatively, the memory chip 15 may include a memory cell array that is not divided into planes. When so divided however, each plane has its own column control circuits 45 and 47 that are operable independently of each other. The circuits 45 and 47 receive addresses of their respective memory cell array from the address portion 19 of the system bus 13, and decode them to address a specific one or more of respective bit lines 49 and 51. The planes 41 and 43 have common word lines 53 that are addressed through row control circuits 55 in response to addresses received on the address bus 19. A NAND architecture of the memory cell arrays 41 and 43 is currently preferred. Source voltage control circuits 57 and 59 are also connected with the respective planes, as are p-well voltage control circuits 61 and 63.

Data are transferred into and out of the planes 41 and 43 through respective data input/output circuits 65 and 67 that are connected with the data portion 17 of the system bus 13. The circuits 65 and 67 provide for both programming data into the memory cells and for reading data from the memory cells of their respective planes, through lines 69 and 71 connected to the planes through respective column control circuits 45 and 47.

Although the controller 11 controls the operation of the memory chip 15 to program data, read data, erase and attend to various housekeeping matters, each memory chip also contains some controlling circuitry that executes commands from the controller 11 to perform such functions. Interface circuits 73 are connected to the control and status portion 21 of the system bus 13. Commands from the controller are provided to a state machine 75 that then provides specific control of other circuits in order to execute these commands. Control lines 77-81 connect the state machine 75 with these other circuits as shown in FIG. 1. Status information from the state machine 75 is communicated over lines 83 to the interface 73 for transmission to the controller 11 over the bus portion 21.

It can be seen from the memory module of FIG. 1 that communication between the controller chip 11 and various parts of the memory chip 15 are dependent upon limitations of communication over a single system bus 13 to which the controller and memory chips are connected in parallel.

As noted above, to increase the performance of controllers within memory modules such as those described above in conjunction with claim 1, controllers have been designed that utilize ring bus architectures to communicate with non-volatile memory and other components within the memory modules. Examples of such controllers are discussed below in conjunction with FIGS. 2-6, as well as disclosed in U.S. Pat. No. 8,375,146, issued Feb. 12, 2013 and assigned to SanDisk Technologies, Inc.

Figure 2:
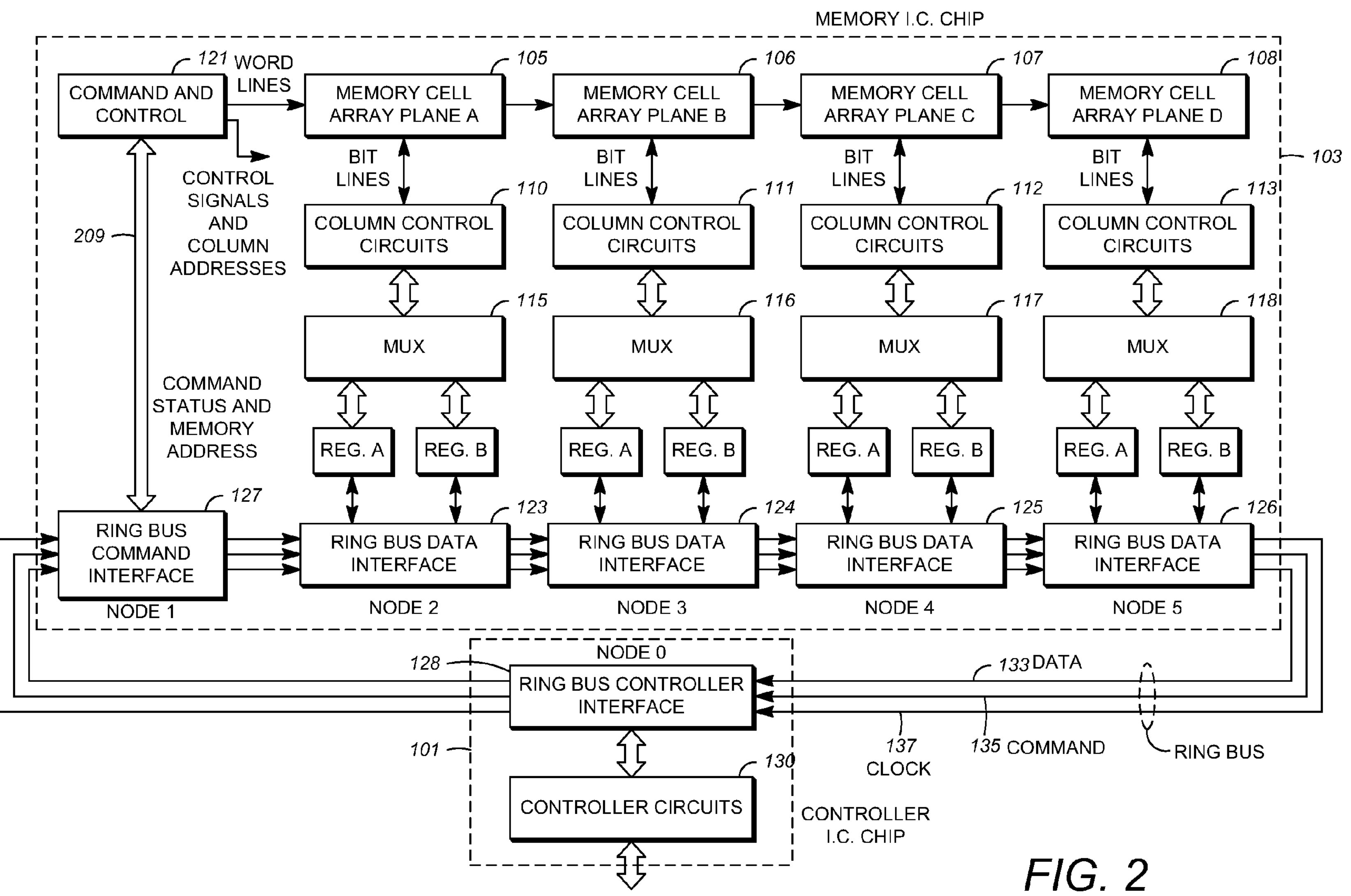
FIG. 2 is a block schematic diagram of one implementation of a flash memory module utilizing a ring bus architecture.

One implementation of a memory module using a ring bus instead of the conventional bus 15 described above is illustrated in FIGS. 2-4. Referring initially to FIG. 2, a controller integrated circuit chip 101 and a single memory chip 103 form the memory module but additional memory chips can also be included. The memory chip 103 is illustrated to have four planes 105-108 of memory cells but fewer, even one, or more than four memory planes may be used instead. Column control circuits 110-113 are connected to the respective planes 105-108. Data are programmed into and read from the memory planes 105-108 through respective multiplexing circuits 115-118 that selects one of two data registers A or B. During data programming, data stored in one of the registers A or B of a particular plane that is selected by its multiplexer is programmed into that plane. Similarly, during data reading, data read from a plane is written into one of the registers A or B selected by its multiplexer. Use of these two registers is not required, a single register could be used instead, but they add a degree of flexibility and parallelism in the operation of the memory module. Command and control circuits 121 provide functions similar to the state machine 75 and various ones of the control circuits of the system of FIG. 1.

In the example of FIG. 2, each of the memory array planes 105-108 communicates data read from the plane or to be programmed into the plane through a respective one of ring bus interface nodes 123-126. Both of the data registers A and B of each plane are connected with the node for that plane. Commands from the controller 101 are received by a ring bus interface node 127 and status signals are sent back to the controller through that same node. The node 127 is connected with the control circuits 121 of the memory integrated circuit chip 103. If additional memory chips are included in the system (not shown in FIG. 2), each will have its own command interface node, in this specific example.

Similarly, the controller chip 101 includes a ring bus node 128 that is connected with a controller 130. The controller 130 of FIG. 2 can be similar to the controller 11 of FIG. 1, except that the node interface 128 (FIG. 2) replaces the memory interface 25.

The nodes 123-128 are connected together in a loop in order to transfer data, addresses, commands and status information between them. That loop is formed by a ring bus having one line 133 carrying data and another line 135 carrying commands from the controller 130. Alternatively, two or more data lines can be used and/or two or more command lines can be included in the ring bus in order to increase the information transfer bandwidth but this comes at the expense of more complex bus node circuitry and operation. Another line 137 may be included in the bus to carry the clock signal to the nodes. Alternatively, the clock line may be omitted if a self-timed format is adopted for information on the data line 133 and on the command line 135.

The system of FIG. 2 is operated to transfer data and commands on the ring bus in a pipelined manner, with a delay of one or only a few clock cycles preferably introduced at each node. The data line 133, command line 135 and clock line 137 follow identical paths on the integrated circuit chips 101 and 103, and between them, and the same delays are introduced in each node to signals in the three lines. Information is only transferred from point-to-point along segments of the bus between adjacent nodes, rather than existing on the entire bus as occurs with a conventional bus, thereby making very high frequency operation of the ring bus possible. The signals on the bus may be fully digital with their amplitude set by the available power supply voltage. However, a higher operating frequency and reduced power dissipation may be achieved by utilizing an appropriate high speed signaling technique instead, such as low voltage swing signaling, fully differential signaling, pseudo-differential signaling, double data rate or the use of current mode drivers.

In some implementations, commands may originate only in the controller node 128, which makes it the single master on the ring bus. Command codes are communicated from the controller node 128 on the command line 135 for execution by one or more of the other nodes 123-127. When only a single node is targeted for execution of a command, a corresponding identification code of the node is transmitted on the data line 133 at the same time. The targeted node is then the only node that accepts the command for execution.

Data transferred on the data line 133 may originate in any one of the nodes 123-128 (source node) and be directed to any one or more of the other nodes (destination nodes). Prior to such data transfer, the source and destination nodes are configured for it. Transfer of the data around the ring bus then takes place. The data being transferred preferably travels around the entire ring bus and back to the originating mode. This assures that the transferred data can be read by any of the other nodes that are configured to do so, such as a node that checks the validity of the data by use of an ECC. This also makes it possible for the originating node to check the received data for errors occurring during transmission around the ring bus, such as by a comparison with the original transmitted data or with use of redundant parity bits.

In some implementations of the memory modules of FIG. 2, data is transmitted around the ring bus on the data line 133 in frames or time slots utilizing time division multiplexing, as discussed in U.S. Pat. No. 8,375,146. This allows concurrent transfer around the ring bus of two or more different channels of data, such as different data sectors, which may have different source and/or destination nodes. The number of time slots used for each transfer of data is selected to accommodate the number of concurrent data transfers to take place. This fully utilizes the bandwidth of the ring bus while allowing certain functions of the individual nodes to operate with a lesser bandwidth, as well as the memory data programming and writing circuitry connected with individual nodes.

Figure 3:
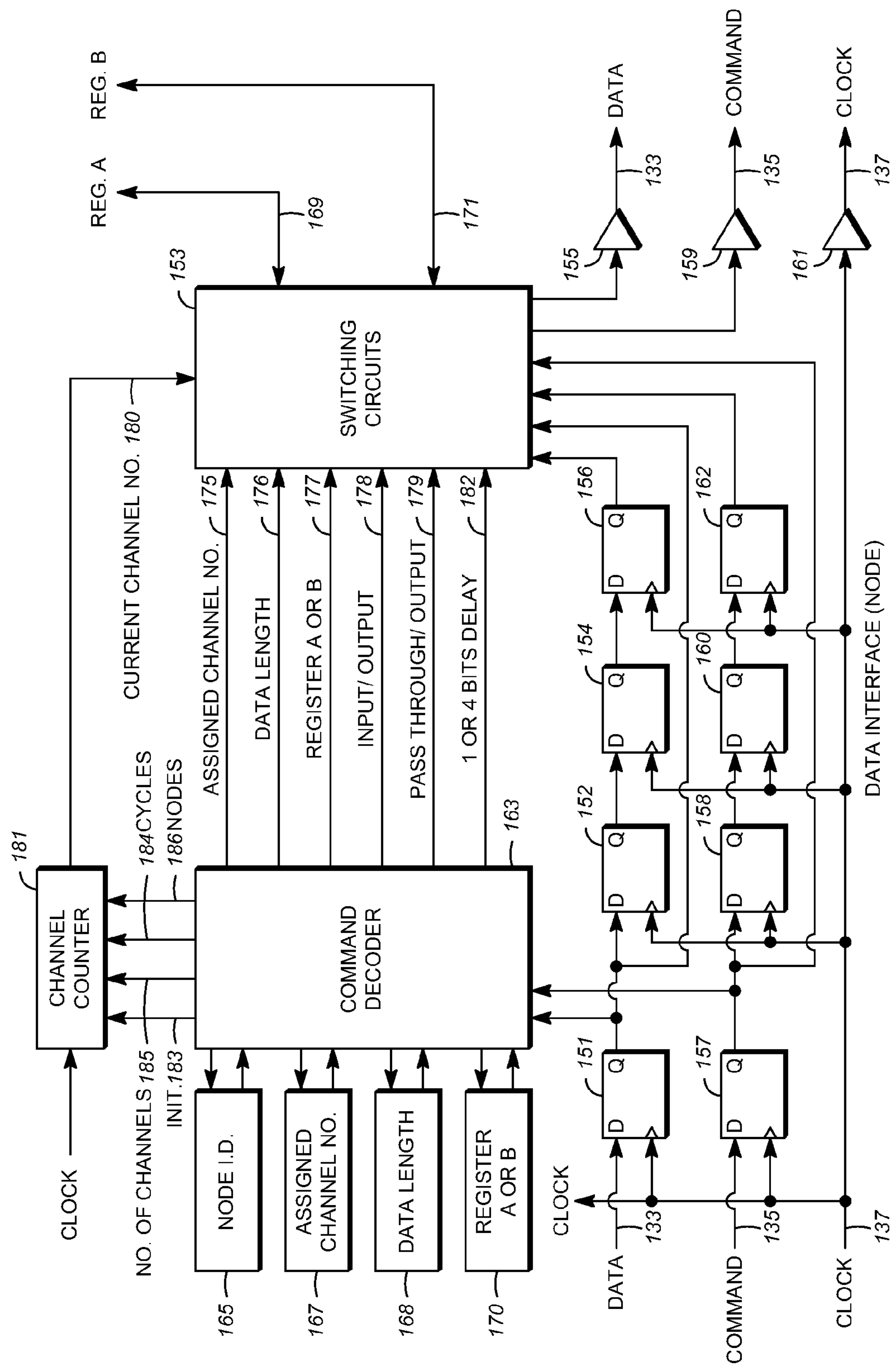
FIG. 3 is a circuit schematic diagram of the ring bus data interface blocks of the memory module of FIG. 2.

An example circuit implementation for each of the data nodes 123-126 of FIG. 2 is shown in FIG. 3. A signal of a bit of data on the data line 133 of the ring bus is received by a register stage 151 and shifted through successive registers 152, 154 and 156 in series. Four register stages are illustrated to match a time slot length A of four clock cycles. The outputs of the last stage 156, and of the first stage 151, are both connected as inputs to a switching circuit 153. This allows the circuit 153 to operate with either one or four cycles of delay. An output of the switching circuit 153 is connected back to the data line 133 through a driver 155. When the switching circuit 153 has its input from the register 156 connected to its output driver 155, the most common configuration, a bit of data received by the register 151 of a data node is placed back on the data line 133 four clock cycles later for transmission to the next data node over another segment of the ring bus. Similarly, when the switching circuit 153 has its input from the register 151 connected to its output driver 155, the delay is one clock cycle. The switching circuit 153 will not have either of these data bus inputs connected to its output during a time slot in which data are being placed on the data line by the node from one of its registers A or B.

If the data bus uses two or more parallel data lines, rather than the single line illustrated, separate register stage(s) are provided for each line and the switching circuits 153 switch them together. For example, if the data bus contains four lines, the data node includes a single register stage in each line. In such a case, the total delay for each node to transfer four bits of one time slot through it is a single clock cycle instead of four cycles. Although this beneficially increases the bandwidth of the bus, the circuitry and operation of the system are more complicated.

The command line 135 input to the data node is similarly connected to another series of four registers 157, 158, 160 and 162. Commands are routed on the command line 135 in synchronism with data on the data line 133, namely with the same delays imposed. The output of the last register 162 is connected to the switching circuit 153, as is the output of the first register stage 158, similar to the data register path. Either of these inputs may be connected by the switching circuit 153 to a driver 159 for placing the command information onto the next segment of the ring bus with a delay of either one or four clock cycles. Neither of these inputs is connected to the driver 159 when the node needs to place a pip onto the command line 135, which it does to indicate that valid data are being placed on the data bus 133 by the node in the time slot then occurring. If the data bus contains two or more lines, the command bus is preferably constructed similarly, including the use of parallel registers, so that the two busses operate in synchronism.

The clock signal line 137 is connected directly with a driver 161 and provides clocking for the data and command register stages, as well as a clock signal for the remaining circuits of the data node.

A decoder 163 receives controller commands from the command line 135 at the output of the register 157, and associated data on the data line 133 at the output of the register 151. Among the functions of the decoder is the execution of commands to configure its node to either receive or transmit data in a subsequent data transmission. Data associated with the commands that are supplied on the data line 133 can include the node identification number for which the command is intended, the channel number over which data are to be transmitted or received, whether the register A or B is to be used, the length of the data being transferred, and other configuration information.

A register 165 contains a unique identification number for the node that is stored in it upon power-up or other initialization of the memory module. A global initialization command issued by the system controller preferably accomplishes this. The identification number is used during operation as an address for commands from the controller that are intended for the node. Although all nodes on the ring bus will receive a command, the command is transmitted over the bus with the identification number of the node for which the command is intended. Only the node or nodes addressed with their identification number will therefore respond to store and then execute the command.

Another register 167 contains a number of the channel of the time multiplexed data bus over which the particular node is communicating. This channel number is typically rewritten as part of the configuration of the node prior to each transmission of data to or from the node over the data bus 133. During data transmission, the stored channel number is used to identify occurrences of the time slot of the assigned channel for the node to transmit or receive data. The length of the data to be transferred in a current transfer operation is stored in another register 168, and a designation of which of the registers A or B is being used for the transfer in a register 170. The parameters of the registers 167, 168 and 170 are loaded into them through the decoder 163 by a command send around the bus on the command line 135 that includes the node identification number stored in the register 165.

The switching circuits 153 of FIG. 3 establish a connection between the data bus line 133 and one of the registers A and B (those shown in FIG. 2) through one of respective data lines 169 and 171. The control circuits configure the node to transfer data between one of the registers A or B and the data line 133. When transferring data from the bus for storage in the memory plane of the node, the circuits 153 direct data from the bus line 133 at the output of either the register 151 or the register 156, as selected by a decoded control signal on a line 182, to one of the registers A and B, as selected by a control signal on a line 177. When transferring data in the reverse direction from a selected one of the registers A or B to the data bus line 133 during the time slot assigned to the node, however, the switching circuits 153 connect an output of the selected register to the driver 155 while disconnecting the segment of the data bus line 133 between the register 151 and the driver 155. During other times, the switching circuits 153 are connected to pass data through the node without doing anything with the data, except for imparting the one or four clock cycles of delay. A pass-through connection of the data bus line 133 between either the register 151 or the register 156 and the driver 155 is maintained when the node is not transferring data between one of its data registers A or B and the data bus 133.

Control of the switching circuits 153 to make these connections at appropriate times comes from signals from the decoder 163 over control lines 175-179 and 182, and from an output of a channel counter 181 over other control lines 180. The counter 181 is controlled by the decoder 163 with four signals on lines 183-186. Line 183 carries an initialization signal that resets the counter 181 at the beginning of a data transfer operation with the node. The line 185 carries data of the number of channels being used for the current data transmission, which is communicated by the controller as part of setting up the nodes for the data transfer. The number of nodes D on the bus ring is also supplied to the counter 181 over lines 186, and the number of cycles N is communicated over circuits 184. The counter 181 counts to the highest channel number and is then reset to the lowest channel number, is paused, begins counting again, and so on. The current count, and thus the current channel number, is input to the switching circuits 153 over lines 180. The circuits 153 compare that number with the channel number that is assigned to the node, provided from the decoder over the control lines 175 from the register 167. When these numbers are the same, the circuits 153 switch the node to receive or transmit data from or to the data bus 133 until the transfer is complete, as determined from the length of the data transmission provided on control lines 176 from the register 168.

A control signal on the lines 177 specifies whether data are being transferred with register A or register B of the node. Lines 178 and 179 carry signals that switch the circuits 153 to (1) receive data from the data bus line 133, in which case the data bus passes through the node and the register identified by the control lines 177 is connected to it, (2) transmit data from the identified register onto the bus line 133 during the time slot assigned to the node, during which time slot the bus line 133 does not pass-through the node, or (3) pass the data bus line 133 through the node without connection with either of the registers A or B.

The data interface node described with respect to FIG. 3 controls data transfer between the bus 133 and the registers A and B. Reading data from the memory cell array plane into the registers A or B for transfer onto the bus 133, or programming data into the memory cell array from the registers A or B that were obtained from the bus 133, are controlled through the command ring bus interface node 127 (FIG. 2). An example of a command node circuit is given in FIG. 4, where elements that are counterparts to those of FIG. 3 are identified by the same reference numbers but have a prime (') added to them. A register 193 stores command data received from the command bus 135 upon being enabled by a control signal in a line 195 from a decoder 197. Similarly, a register 199 stores data received from the data bus 133 when enabled by a signal in line 201 from the decoder. The primary use of the register 199 is to store addresses within the memory cell array(s) that are being accessed for reading or programming.

Figure 4:
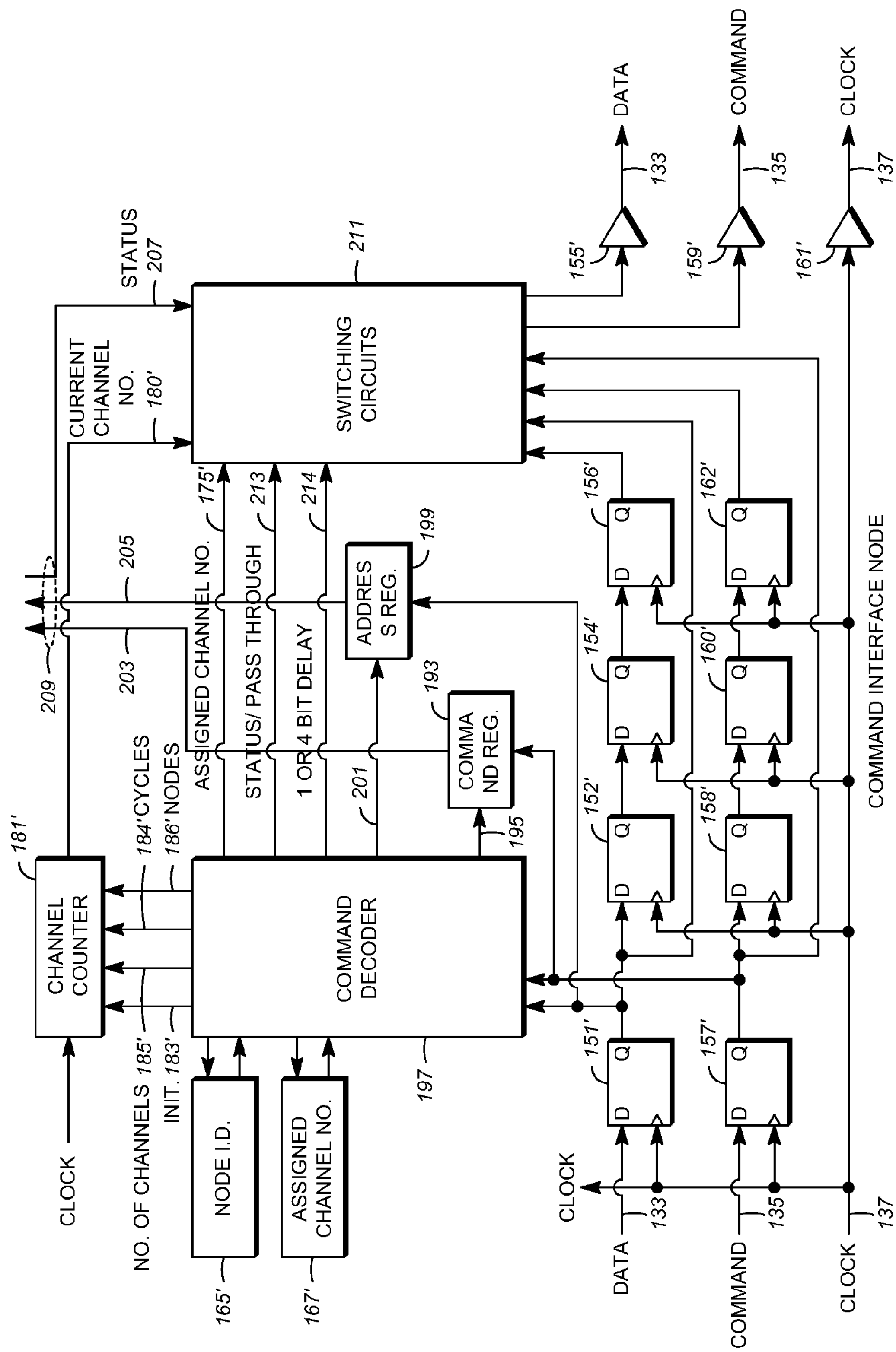
FIG. 4 is a circuit schematic diagram of the ring bus command interface block of the memory module of FIG. 2.

Data in the registers 193 and 199 are outputted over respective lines 203 and 205, which, along with status signal lines 207, are connected with the memory array control circuits 121 (FIG. 2) over signal path 209. The principle commands carried by lines 203 are those to program and read data to and from one or more of the memory planes 105-108, at locations specified by addresses in the lines 205, and from or into one of the registers A or B. The command codes carried on lines 203 are those specified by the protocol for the command and control circuits 121 (FIG. 2) within the memory chip 103. This protocol need not be identical to that of the command codes used within the ring bus. For example, ring bus command codes may be of a different length from command codes used with the memory cell arrays. In this case, a code translator (not shown) may be incorporated on the output of the command register 193 (FIG. 4). Mapping information, to convert one protocol to the other, may be loaded into the translator by a system configuration command. The status lines 207 provide status signals from the control circuits 121 and through switching circuits 211 to the data bus line 133 in one of the time multiplexed channels designated when setting up the memory module for transferring data between nodes.

The switching circuits 211 of FIG. 4 are simpler in function than the switching circuits 153 of FIG. 3. The data line 133 is passed through between either the register 151' or register 156', as selected by a control signal in lines 214, and the driver 155' at all times except during the time slots that status information from the lines 207 is being placed on the line 133. The occurrence of the configured time slot is determined by the switching circuits 211 from the channel counter 181' and assigned channel number in lines 175', in the same manner as the switching circuits 153 of FIG. 3, as well as control signals on lines 213. Status information is placed on the bus 133 during a transfer of data between nodes while the receipt of commands and addresses into registers 193 and 199 from the system controller occurs prior to or after data transfer, earlier to read data out of flash memory into one or both of registers A and B for transfer to another node or later to program into flash memory data that have been transferred into these registers from another node.

Figure 5:
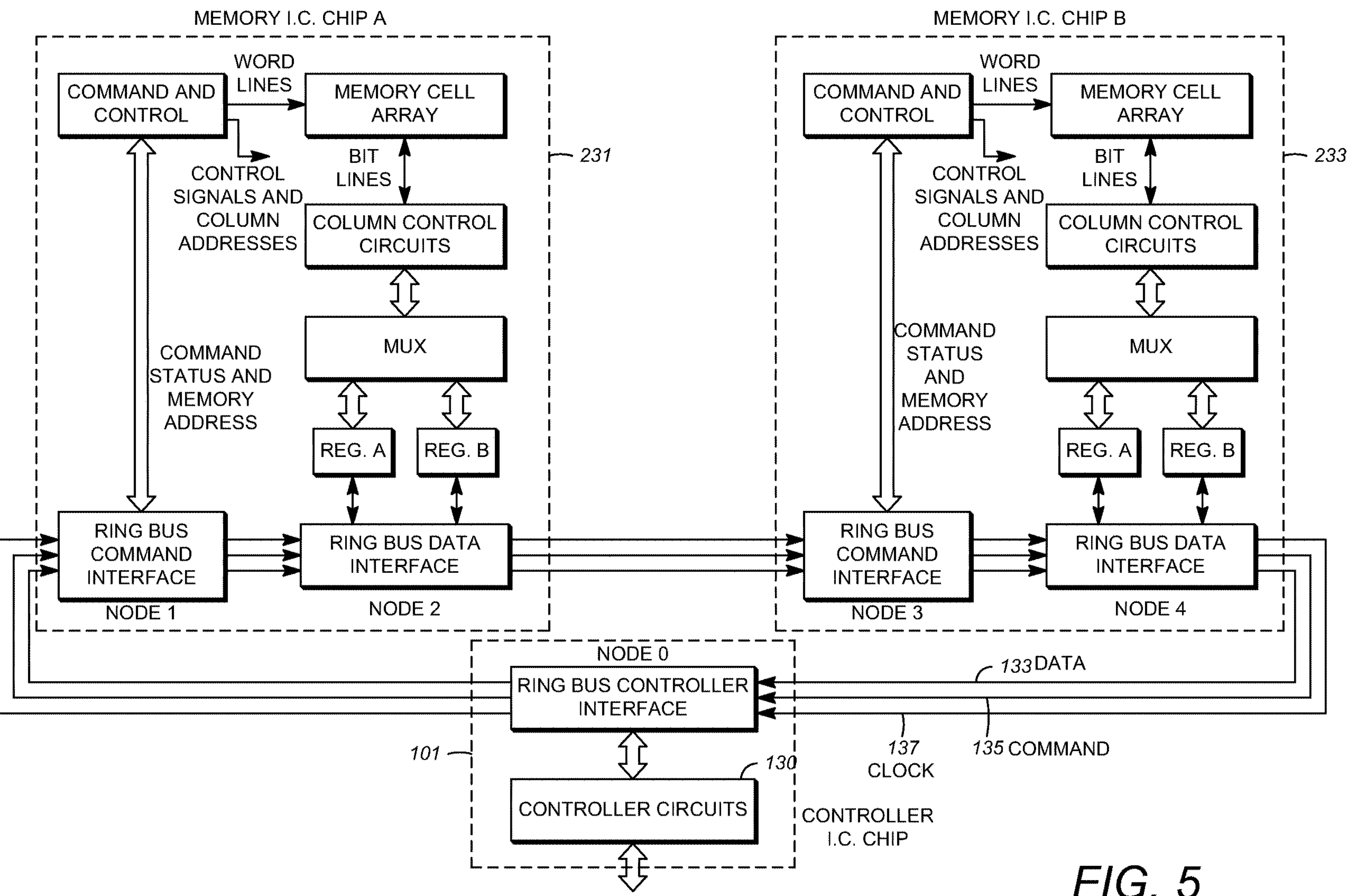
FIG. 5 is a block schematic diagram of another implementation of a flash memory module utilizing a ring bus architecture.

There are many variations of the memory module architecture of FIG. 2 that can be made while still operating the system with the commands and in the manner described above. Instead of the memory chip(s) having four memory planes, the memory chip may have a single undivided memory cell array, as illustrated in FIG. 5. Two memory chips 231 and 233 are there shown to be connected with the controller chip 101 in a ring bus. Each of the memory chips 231 and 233 includes a single command node and a single data node connected by the bus in a ring as described previously. More than two memory chips may be used in a particular system.

Figure 6:
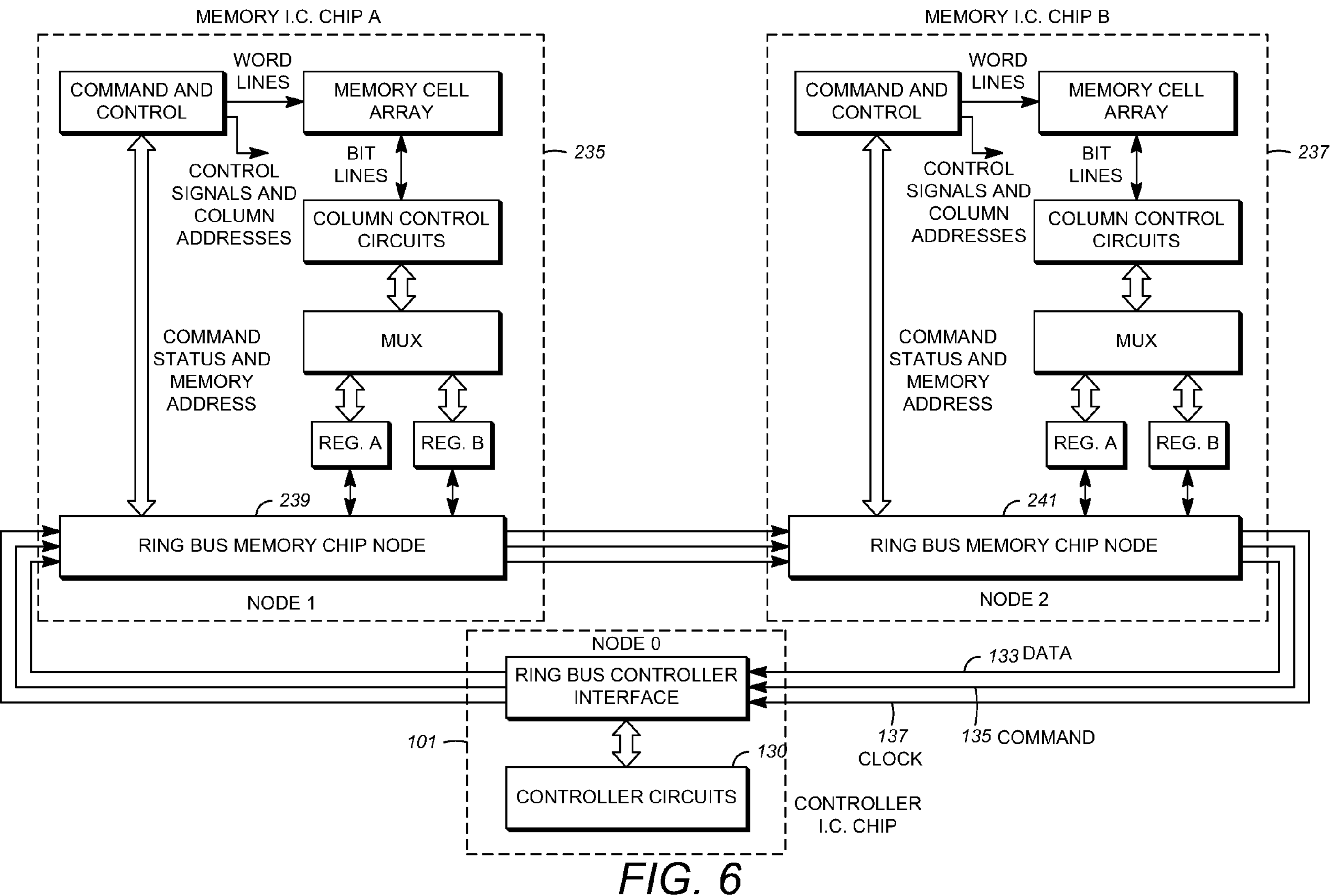
FIG. 6 is a block schematic diagram of yet another implementation of a flash memory module utilizing a ring bus architecture.

A further possible variation is shown in FIG. 6, wherein each of two memory chips 235 and 237 are also connected with the controller chip 101 on the ring bus but each memory chip includes a single combined command and data node 239 and 241 respectively. The nodes 239 and 241 individually have the separate node circuitry of FIGS. 3 and 4 combined into one circuit. The advantage to this is that the node circuitry can be reduced by eliminating duplicate components such as the switching circuits, the command decoders, the channel counter, various storage registers, and the like.

To enhance performance of memory modules such as those described above in conjunction with FIGS. 2-6, memory modules may utilize a primary ring bus and one or more secondary ring busses in communication with the primary ring bus via bus bridges (also referred to as routing circuitry).

It will be appreciated that the memory modules described below may be, for example, flash memory embedded within a host system, such as in the form of a solid state disk (SSD) drive installed in a personal computer or an iNAND installed in a device. SSD drives may be in the form of discrete modules that are drop-in replacements for rotating magnetic disk drives. Alternatively, the memory module may be in the form of a card, for example, that is removably connected to a host system through mating parts of a mechanical and electrical connector.

Figure 7:
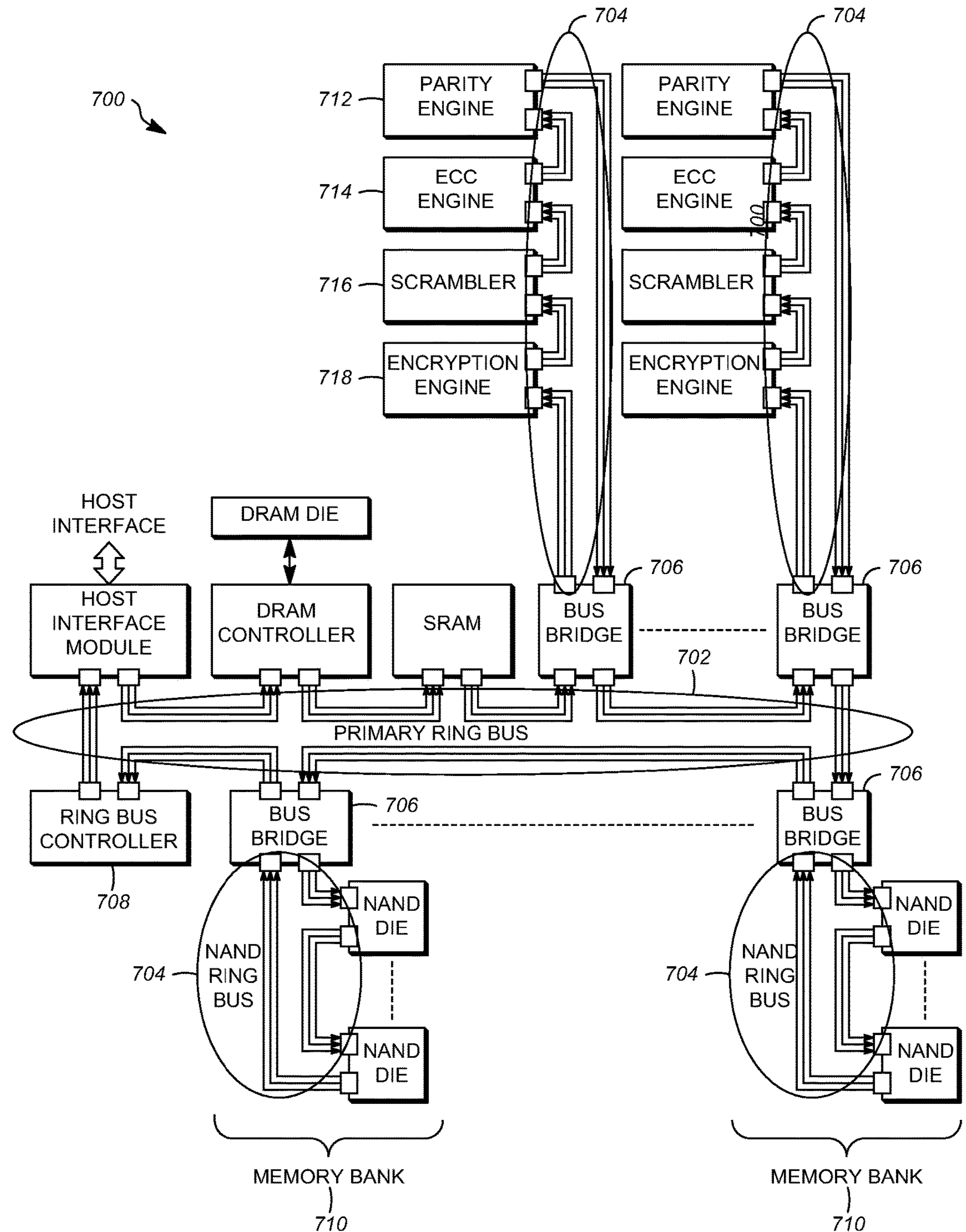
FIG. 7 is a block diagram of one implementation of an architecture of a memory module utilizing a primary ring bus and one or more secondary ring busses in communication with the primary ring bus via bus bridges.

FIG. 7 is a block diagram of one implementation of an architecture of a memory module 700 utilizing a primary ring bus 702 and one or more secondary ring busses 704 in communication with the primary ring bus via bus bridges 706.

Similar to the implementations described above, components of the memory module 700 positioned on the primary ring bus 702 via command and/or data interface nodes may include a ring bus controller 708 and a host interface 710. Other components of the memory module have been removed from the primary bus ring 702 and positioned on one or more secondary ring busses 704.

For example, components positioned via command and/or data interface nodes on a secondary ring bus 704 may include one or more non-volatile memory units 710 such as NAND memory die in serial communication with each other. As used herein, the term die refers to a set of non-volatile memory cells, and associated circuitry for managing the physical operation of those non-volatile memory cells, that are formed on a single semiconductor substrate. Components positioned via command and/or data interface nodes on a secondary ring bus 704 may also include components such as a parity engine 712, an error correction code (ECC) engine 714, a scrambler 716, and/or an encryption engine 718. In other implementations, one or more of the non-volatile memory units 710, parity engine 712, error correction code (ECC) engine 714, scrambler 716, and/or an encryption engine 718 may be positioned on the primary ring bus 702 while the remaining components are positioned on one or more secondary ring busses 704.

Due to the secondary ring busses 704, fewer components are positioned on the primary ring bus 703 when compared to the memory modules described above in conjunction with FIGS. 2-6. Due to the reduced number of components positioned on the primary ring 702, data may travel around the primary ring bus 702 more quickly when bypassing components on a secondary ring bus 704.

Additionally, memory modules may perform concurrent data transfers between multiple source and destination nodes along the primary ring bus 702 and secondary ring busses 704 to reduce system latency and increase performance. It should be appreciated that both the primary ring bus 702 and each individual secondary ring bus 704 may be a serial bus employing a time-division-multiplexing scheme, wherein frames of data from different independent streams are transferred concurrently on a bus within interleaved time slots. However, each of the primary ring bus 702 and the individual secondary ring busses 704 have a maximum data transfer bandwidth, which is set by the physical and electrical parameters of the bus. A higher number of streams for which data is being transferred concurrently on a bus results in a lower data transfer rate for each stream, although the overall bus data bandwidth is unchanged. Where an architecture with secondary ring busses 704 is employed, data transfers between nodes on the same secondary ring bus are concurrent with and do not influence data transfers on the primary ring bus 702 or other secondary ring busses 704. Data transfers between memory die with a common memory management algorithm is very widespread in non-volatile memory modules, particularly during maintenance operations such as garbage collection. Therefore, the use of a secondary ring bus 704 to interconnect such die increases the data transfer bandwidth of the overall system, compared to what can be achieved by use of a single primary ring bus.

During operation, the ring bus controller 708 monitors data movement along the primary ring bus 702 and secondary ring busses 704. Prior to sending a command and/or data to a component positioned on secondary ring bus 704, the ring bus controller 708 generates and sends a configuration command to the bus bridge 706 that is in communication with the relevant secondary ring bus 704.

The configuration command may include an indication to the bus bridge 706 to route a future command from the primary bus ring 702 to the secondary ring bus 704 extending from the bus bridge 706. In response to the configuration command, the bus bridge 706 configures itself to route commands and/or data from the primary ring bus 702 to the secondary ring bus 704.

In the implementations described above where the ring bus includes a data line, a command line, and a clock, when the bus bridge 706 receives the configuration command, the bus bridge 706 may configure itself to route a command from a command line of the primary ring bus 702 to a command line of the secondary ring bus 704 and to route a set of data from a data line of the primary ring bus 702 to a data line of the secondary ring bus 704.

When the bus bridge 706 is not configured to route a command and/or data from the primary ring bus 702 to the secondary ring bus 704 extending from the bus bridge 706, the bus bridge 706 passes commands and/or data to a subsequent component on the primary ring bus 702, thereby bypassing the secondary ring bus 704 extending from the bus bridge 706.

Similarly, the bus controller 706 may send configuration commands to a bus bridge 704 to control the routing of commands and/or data from a secondary ring bus 704 to the primary ring bus 702. In some implementations, based on a configuration command from the bus controller 706, when the bus bridge 706 receives data from the secondary ring bus 704 extending from the bus bridge 706, the bus bridge may perform one of two actions. The bus bridge 706 may route the command and/or data from the secondary ring bus 704 to the primary ring bus 702, or the bus bridge 706 may continue to route the command and/or data long the secondary ring bus 704.

Figure 8:
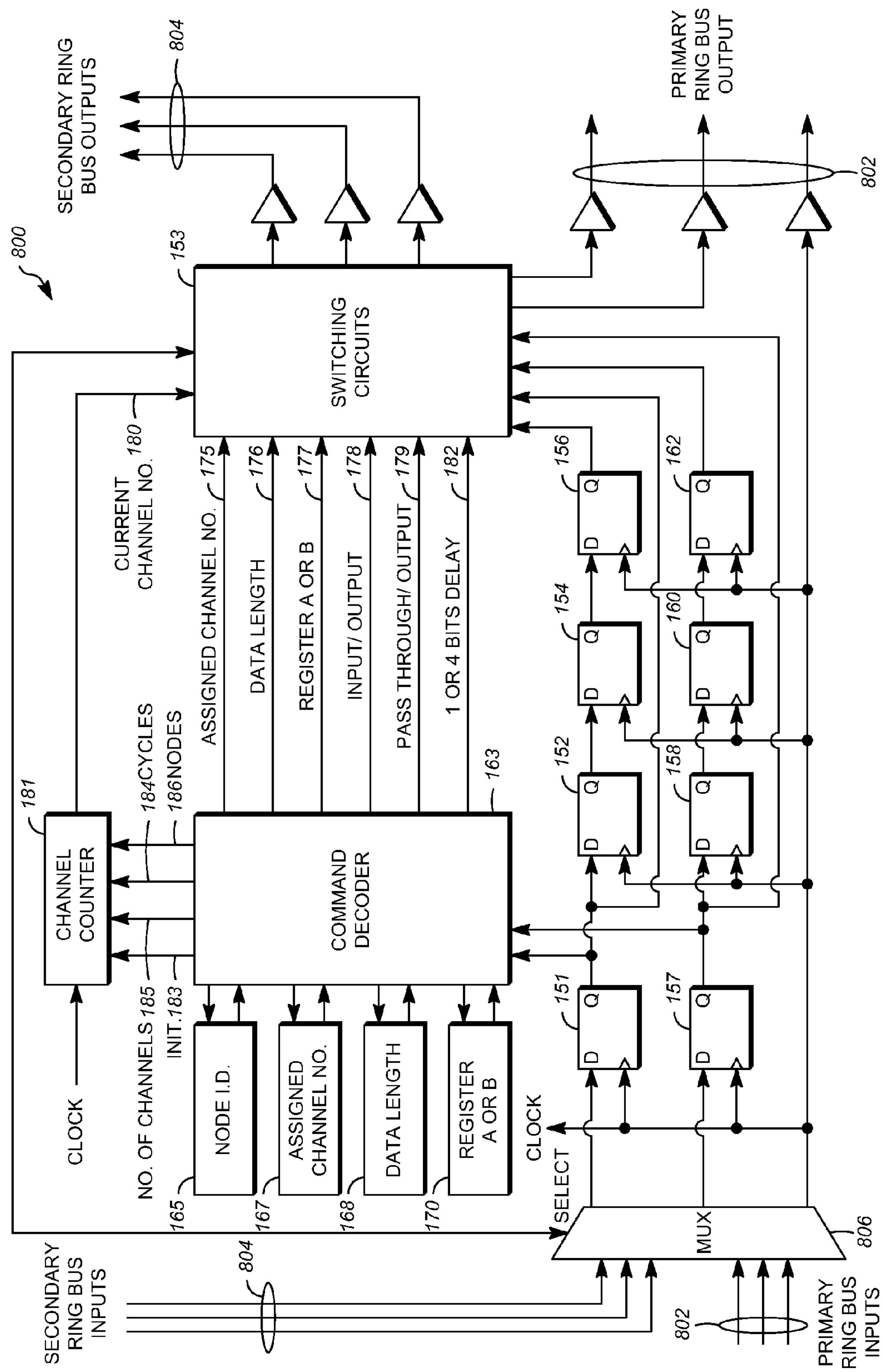
FIG. 8 is a circuit schematic diagram of one implementation of a bus bridge (also referred to as routing circuitry) of FIG. 7.

FIG. 8 is a circuit schematic diagram of one implementation of a bus bridge (also referred to as routing circuitry) of FIG. 7. Components within the bus bridge 800 that operate similarly to the components within the ring bus data interface node and the ring bus command interface node described above in conjunction with FIGS. 3 and 4 have been labeled with the same reference numbers and their operation will not be described again.

Unlike the data interface and command interface nodes described above, the bus bridge 800 contains switching circuitry 153 that is able to control whether data and commands from registers 156 and 162 are routed out of the bus bridge 800 and onto a primary ring bus 802 or onto a secondary ring bus 804 as discussed above. The switching circuitry 153 controls the routing onto the primary ring bus 802 or the secondary ring bus 804 based on configuration commands received at the command decoder 163.

Unlike the data interface and command interface nodes described above, the bus bridge also contains a multiplexer 806. The switching circuitry 153 controls the multiplexer 806 based on configuration commands to control the source of data and commands that the multiplexer 806 routes into registers 151 and 157. Based on configuration commands, the multiplexer may be configured to route data and commands from either the primary ring bus 802 or the secondary ring bus 804 to the registers. The switching circuitry 153 controls the routing at the multiplexer 806 from either the primary ring bus 802 or the secondary ring bus 804 based on configuration commands received at the command decoder 163.

Figure 9:
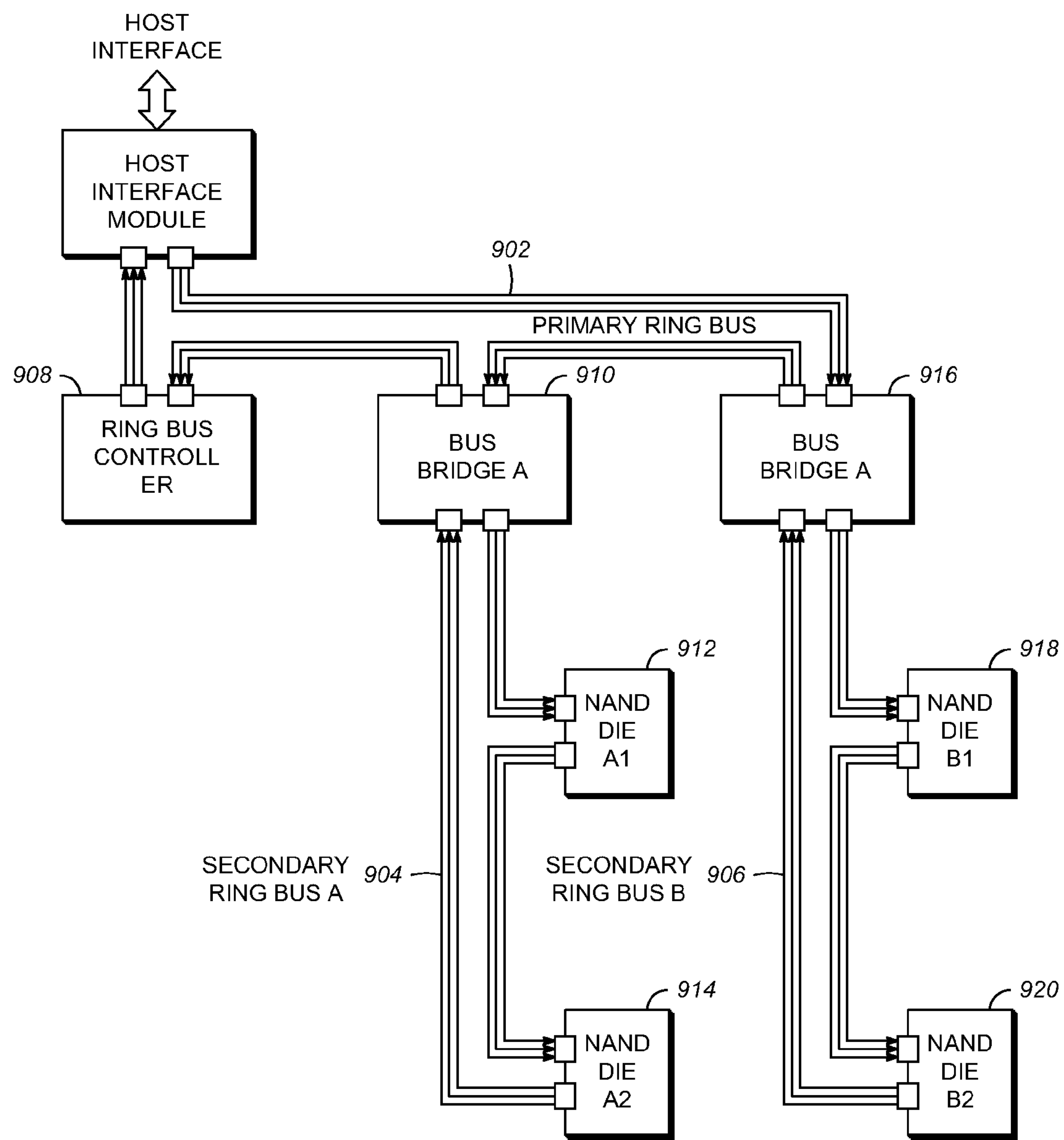
FIG. 9 is an example system topology for a memory module implementing a primary ring bus and two secondary ring busses.

Example bus bridge configurations are described below in conjunction with FIGS. 9 and 10. FIG. 9 is an example system topology for a memory module and FIG. 10 is a table illustrating configurations for the ring busses of FIG. 9 to support various example operations.

Referring to FIG. 9, the system topology includes a primary ring bus 902, secondary ring bus A 904, and second secondary ring bus B 906.

A ring bus controller 908 monitors data traffic and sends configuration commands to a first bus bridge 910 in order to control operations on secondary ring bus A 904. For example, the ring bus controller 908 may control the movement of data on secondary ring bus A 904 between NAND die A1 912 and NAND die A2 914.

Similarly, the ring bus controller 910 monitors data traffic and sends configuration commands to a second bus bridge 916 in order to control operations on secondary ring bus B 906. For example, the ring bus controller 908 may control the movement of data on secondary ring bus b 906 between NAND die B1 918 and NAND die B2 920.

FIG. 10 is a table illustrating configurations for the ring busses of FIG. 9 to support various example operations. For example, referring to example operation 3, a command needs to be sent from the ring bus controller 908 to NAND die A1 912 on secondary ring bus A 904. To conduct this operation, the ring bus controller 908 sends configuration commands to set bus bridge B 916 to bypass secondary ring bus B 906; to set bus bridge A 910 to route data and commands from the primary ring bus 902 to secondary ring bus A 904; and to route data from bus bridge A 910 to NAND die A1 912.

In another example, referring to example operation 10, a copy of data from NAND die A1 912 is sent to NAND die B1 918. Therefore, data must be sent from secondary ring bus A 940 to secondary ring bus B 906. To conduct this operation, the ring bus controller 908 sends configuration commands to set secondary ring bus A 904 to route data and commands from NAND die A1 912 to bus bridge A 910; to set bus bridge A 910 to route data and commands from secondary ring bus A 904 to the primary ring bus 902; to set bus bridge B 916 to route data and commands from the primary bus bridge 902 to secondary ring bus B 906; and to set secondary ring bus B 906 to route data and commands from bus bridge 916 to NAND die B1 918.

It should be appreciated that when a ring bus controller 908 has to send a configuration command to a bus bridge 910, 916 in order to support a specific operation on a system channel, the ring bus controller 908 only issues commands to configure bus bridges 901, 916 that are not already in the correct state.

As noted above, the ring bus architecture and the use of multiple secondary ring busses provides for the ability for concurrent operations both on the same secondary ring bus and concurrent operations among multiple ring busses. For example, during operation, the ring bus controller may route a first command and/or data set from a bus bridge to a first memory unit on a secondary ring bus extending from the bus bridge while concurrently routing a second command and/or data set from the first memory unit on the secondary ring bus to a second memory unit on the same secondary ring bus.

Similarly, the ring bus controller may perform actions such as storing a data set at a first memory unit on a secondary ring bus while concurrently storing another data set at a second memory unit on the same secondary ring bus. Further, the ring bus controller may perform actions such as storing a data set at a first memory unit on a secondary ring bus while concurrently reading another data set from a second memory unit of the same secondary ring bus.

With respect to concurrent operations among multiple secondary ring busses, the ring bus controller may perform actions such as routing a first data set to a memory unit on a first secondary ring bus while concurrently routing a second data set to a memory unit on a second secondary ring bus; storing a first data set at a memory unit on a first secondary ring bus while concurrently storing a second data set at a memory unit on a second secondary ring bus; and/or storing a first data set at a memory unit on a first secondary ring bus while concurrently reading a second data set from a memory unit on a second secondary ring bus.

Figure 11:
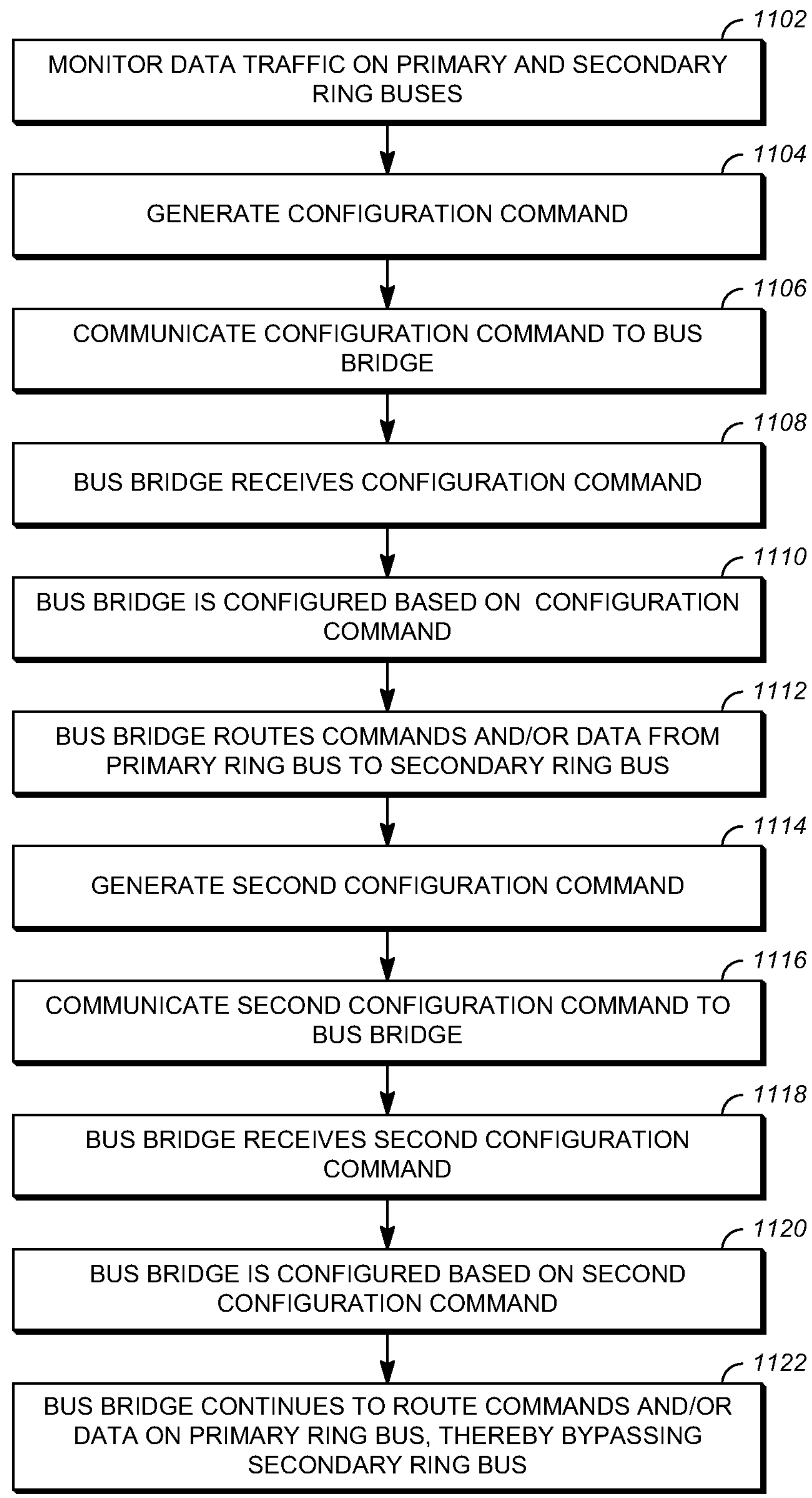
FIG. 11 is a flow chart of one implementation of a method for managing data in a memory module utilizing a primary ring bus and one or more secondary ring busses.

FIG. 11 is a flow chart of one implementation of a method for managing data in a memory module utilizing a primary ring bus and one or more secondary ring busses. The method begins with at step 1102 with a ring bus controller monitoring data traffic on a primary ring bus and data traffic on a secondary ring bus extending from a bus bridge.

At step 1104, the ring bus controller generates a configuration command to send to the bus bridge. The configuration command may include an indication for the bus bridge to route a future command and/or data set from the primary ring bus to the secondary ring bus extending from the bus bridge.

As discussed above, the ring bus controller may generate the configuration command when, for example, the ring bus controller determines a need to store data at a non-volatile memory unit, such as a NAND memory die, positioned on the secondary ring bus; to read data from a non-volatile memory unit positioned on the secondary ring bus; and/or to process data with a component such as a parity engine, an error correction code (ECC) engine, a scrambler, and/or an encryption engine positioned on the secondary ring bus.

At step 1106, the ring bus controller communicates the generated configuration command to the bus bridge by sending the configuration command to the bus bridge along the primary ring bus.

At step 1108, the bus bridge receives the configuration command. At step 1110, based on the configuration command, the bus bridge configures itself to route commands and/or data present on the primary ring bus to the secondary ring bus extending form the bus bridge. As discussed above, in implementations where the primary ring bus and the secondary ring bus include lines such as data and command lines, the bus bridge may be configured to route a command from a command line of the primary ring bus to a command line of the secondary ring bus. Similarly, the bus bridge may be configured to route a data set from a data line of the primary ring bus to a data line of the secondary bus ring extending from the bus bridge.

At step 1112, after the bus bridge is configured, the bus bridge receives a command on the primary ring bus and routes the command to the secondary ring bus. Further, at step 1112, after the bus bridge is configured, the bus bridge receives a data set on the primary ring bus and routes the data set to the secondary ring bus.

It will be appreciated that the ring bus controller may additionally reverse this process so that future commands and/or data bypass the secondary ring bus extending from the bus bridge. At step 1114, the ring bus controller may generate a second configuration command indicating that future commands and/or data should bypass the secondary ring bus extending from the bus bridge, and at step 916, the ring bus controller communicates the second configuration command to the bus bridge by sending the second configuration command to the bus bridge along the primary ring bus.

At step 1118, the bus bridge receives the second configuration command. At step 1120, based on the configuration command, the bus bridge configures itself to continue routing future commands and/or data sets along the primary ring bus, thereby bypassing the secondary ring bus extending from the bus bridge.

At step 1122, after the bus bridge is configured in response to the second configuration command, the bus bridge receives a command on the primary ring bus and continues to route the command on the primary ring bus. Further, at step 1122, after the bus bridge is configured in response to the second configuration command, the bus bridge receives a data set on the primary ring bus and continues to route the command on the primary ring bus.

The method described above in conjunction with FIG. 11 allows a bus controller to selectively route information such as commands and/or data to secondary ring busses. By selectively bypassing secondary ring busses, information is able to travel around the primary ring bus more quickly. Further, the ring bus controller is able to more efficiently perform concurrent operations both among components within the same secondary ring bus as well as among components of different secondary ring busses. Examples of concurrent operations that the bus controller may perform include routing data between adjacent components or memory units on a primary or secondary ring bus; storing data to a non-volatile memory unit on a primary or secondary ring bus; reading data from a non-volatile memory unit on a primary or secondary ring bus; and/or processing data with components on a primary or secondary ring bus such as a parity engine, an error correction code (ECC) engine, a scrambler, and/or an encryption engine.

As discussed above, where an architecture with secondary ring busses is employed, data transfers between nodes on the same secondary bus are concurrent with and independent from data transfers on the primary bus or other secondary busses. The use of a secondary ring bus to interconnect memory die increases a data transfer bandwidth of an overall system when compared to what can be achieved by use of a single primary bus.

However, when data is being copied between memory die on a secondary ring bus, there may be a need to access other components of the memory system, such as the ECC Engine, Encryption Engine, Scrambler and SRAM, located on a different secondary ring bus. In some implementations it may be undesirable to consume available data bandwidth on the primary ring bus, in order to connect two secondary ring busses for this purpose.

To address this, sub components such as the ECC Engine, Encryption Engine, Scrambler and SRAM may be positioned on a tertiary ring bus, which is accessible via bus bridges from multiple secondary busses without additional loading on a primary ring bus.

Figure 12:
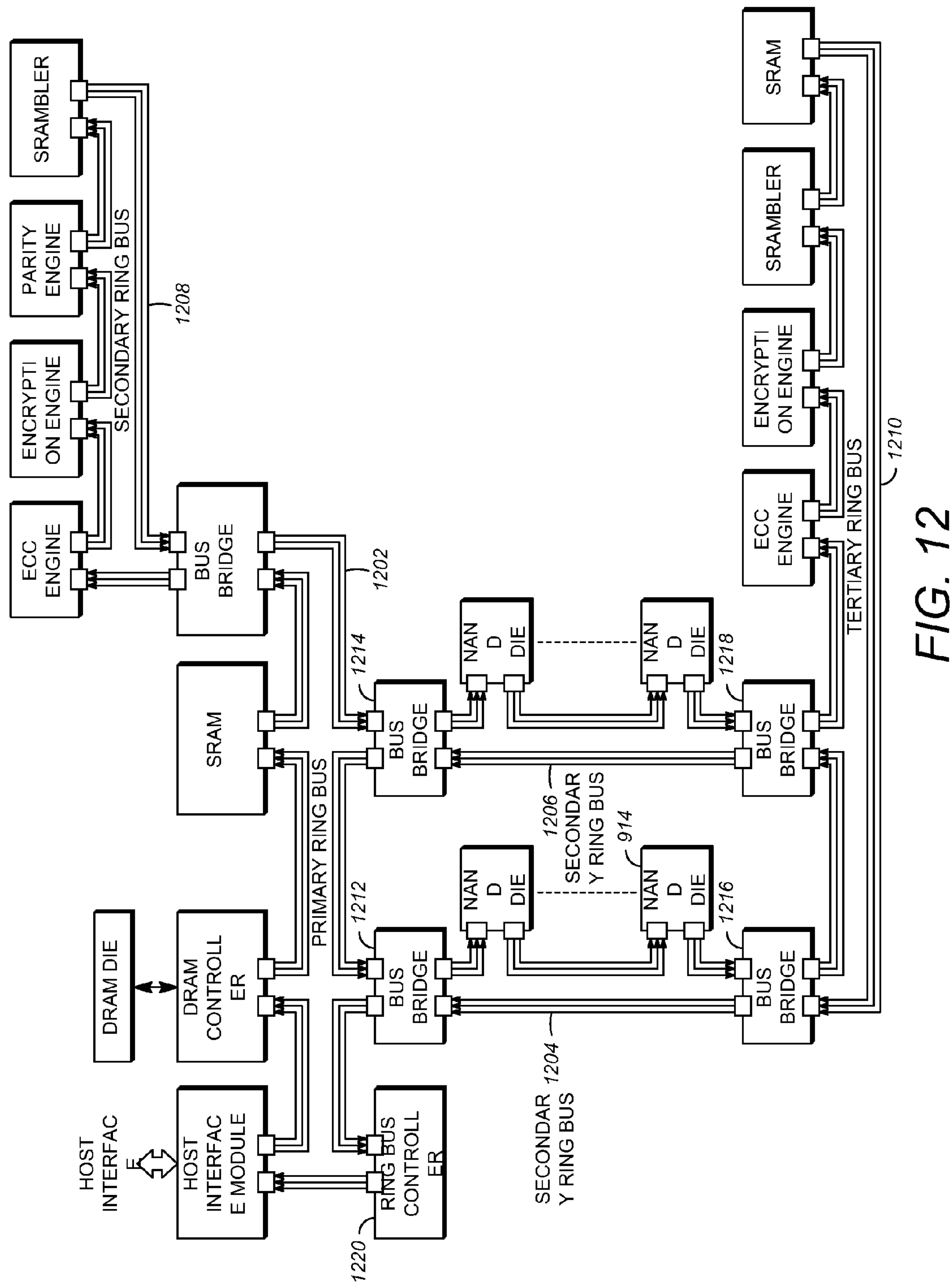
FIG. 12 is a block diagram of one implementation of an architecture of a memory module utilizing a primary ring bus, secondary ring busses, and a tertiary ring bus in communication with each other via bus bridges.

FIG. 12 is a block diagram of one implementation of an architecture of a memory module utilizing a primary ring bus, secondary ring busses, and a tertiary ring bus. Similar to the implementations described above, the memory module includes a primary ring bus 1202, a first secondary ring bus 1204, a second secondary ring bus 1206, and a third secondary ring bus 1208. However, unlike the memory modules described above, the memory module additionally includes a tertiary ring bus 1210 in communication with the first and second secondary ring busses 1204, 1206.

Similar to bus bridges 1212, 1214 that couple the first and second secondary ring busses 1204, 1206 to the primary ring bus 1202, bus bridges 1216, 1218 couple the first and second secondary ring busses 1204, 1206 to the tertiary ring bus 1210.

For example, as data travels around the first secondary ring bus 1204 and reaches bus bridge 1216, the configuration of bus bridge 1216 dictates whether data continues to travel around the first secondary ring 1204 or is alternatively routed to the tertiary ring bus 1210. Further, as data travels around the tertiary ring bus 1210 and reaches bus bridge 1216, the configuration of bus bridge 1216 dictates whether data continues to travel around the tertiary ring bus 1210 or is alternatively routed to the first secondary ring bus 1204.

Similarly, as data travels around the second secondary ring bus 1206 and reaches bus bridge 1218, the configuration of bus bridge 1218 dictates whether data continues to travel around the second secondary ring 1206 or is alternatively routed to the tertiary ring bus 1210. Further, as data travels around the tertiary ring bus 1210 and reaches bus bridge 1218, the configuration of bus bridge 1218 dictates whether data continues to travel around the tertiary ring bus 1210 or is alternatively routed to the second secondary ring bus 1206.

During operation, a ring bus controller 1220 monitors data movement along the primary ring bus 1202, secondary ring busses 1204, 1206, 1208, and tertiary ring bus 1210. Prior to sending a command and/or data to a component on one of the secondary ring busses or the tertiary ring bus, the ring bus controller sends one or more configuration commands to the bus bridges along the desired data path, as described above, to configure the bus bridges in the necessary manner.

It should be appreciate that while the implementations described in conjunction with FIG. 12 include a hierarchy of three busses, other memory modules may include additional levels in a hierarchy. For example, the ring bus controller 1220 may control additional bus bridges leading to further ring busses off of the primary ring bus 1202, secondary ring busses 1204, 1206, 1208, and/or the tertiary ring bus 1210.

FIGS. 2-12 and the corresponding descriptions teach ring bus architectures for use in memory modules. The described memory modules provide increased performance through the utilization of a primary ring bus and one or more secondary ring busses in communication with the primary ring bus via bus bridges (also referred to as routing circuitry).

Utilizing multiple ring busses in the memory module allows for concurrent data transfers between multiple source/destination pairs of a ring bus controller, memory units, and/or other components of the memory module such as a host interface, an encryption engine. Additionally, because data is transferred unidirectionally between adjacent notes on the primary ring and/or secondary ring, the memory module is able to operate at high frequencies.

It is intended that the foregoing detailed description be regarded as illustrative rather than limiting, and that it be understood that it is the following claims, including all equivalents, that are intended to define the spirit and scope of this invention.

For example, in the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

The invention claimed is:

1. A method for managing data within a memory module, the method comprising:

receiving, at a first bus bridge via a primary ring bus, a configuration command, the configuration command comprising an indication for the first bus bridge to route a future command to a secondary ring bus extending from the first bus bridge, the first bus bridge positioned on both the primary ring bus and the secondary ring bus;

configuring, based on the configuration command, the first bus bridge to route a command on a command line of the primary ring bus to a command line of the secondary ring bus extending from the first bus bridge and to route a first set of data on a data line of the primary ring bus to a data line of the secondary ring bus extending from the first bus bridge;

after configuring the first bus bridge based on the configuration command:

receiving the command on the command line of the primary ring bus and routing the command to the command line of the secondary ring bus extending from the first bus bridge; and receiving the first set of data on the data line of the primary ring bus and routing the first set of data to the secondary ring bus extending from the first bus bridge;

wherein the secondary ring bus extending from the first bus bridge comprises a non-volatile memory unit, wherein the first bus bridge is in communication with a second bus bridge along the primary ring bus, and wherein a secondary ring bus extending from the second bus bridge comprises a non-volatile memory unit, the method further comprising:

routing the first set of data on the secondary ring bus extending from the first bus bridge to the non-volatile memory on the secondary ring bus extending from the first bus bridge; and while routing the first set of data on the secondary ring bus extending from the first bus bridge, routing a second set of data on the secondary ring bus extending from the second bus bridge to the non-volatile memory unit on the secondary ring bus extending from the second bus bridge.

2. The method of claim 1, further comprising:

generating, with a ring bus controller, the configuration command; and communicating, from the ring bus controller to the first bus bridge, the configuration command along the primary ring bus.

3. The method of claim 1, further comprising:

monitoring, with a ring bus controller, data traffic on the primary ring bus and data traffic on the secondary ring bus extending from the first bus bridge.

4. The method of claim 1, wherein the secondary ring bus extending from the first bus bridge comprises a first non-volatile memory unit in serial communication with a second non-volatile memory unit, the method further comprising:

routing the first set of data on the secondary ring bus extending from the first bus bridge to the first non-volatile memory unit; and while routing the first set of data to the first non-volatile memory unit, routing a second set of data from the first non-volatile memory unit to the second non-volatile memory unit.

5. The method of claim 4, further comprising:

storing the first set of data in the first non-volatile memory unit; and while storing the first set of data at the first non-volatile memory unit, storing the second set of data in the second non-volatile memory unit.

6. The method of claim 4, further comprising:

storing the first set of data in the first non-volatile memory unit; and while storing the first set of data at the first non-volatile memory unit, reading a third set of data from the second non-volatile memory unit.

7. The method of claim 1, further comprising:

storing the first set of data at the non-volatile memory unit on the secondary ring bus extending from the first bus bridge; and while storing the first set of data at the non-volatile memory unit, storing the second set of data at the non-volatile memory unit on the secondary ring bus extending from the second bus bridge.

8. The method of claim 1, further comprising:

storing the first set of data at the non-volatile memory unit on the secondary ring bus extending from the first bus bridge; and while storing the first set of data at the non-volatile memory unit, reading a third set of data from the die on the secondary ring extending from the second bus bridge.

9. The method of claim 1, wherein at least one of the non-volatile memory unit on the secondary ring bus extending from the first bus bridge and the non-volatile memory unit on the secondary ring bus extending from the second bus bridge comprises a silicon substrate and a plurality of memory cells forming at least two memory layers vertically disposed with respect to each other to form a monolithic three-dimensional structure, wherein at least one layer is vertically disposed with respect to the silicon substrate.

10. A memory module comprising:

a ring bus controller;

first routing circuitry;

a first ring bus connected to the first routing circuitry;

a first plurality of non-volatile memory units, each non-volatile memory unit comprising a memory die;

a second ring bus connecting the first routing circuitry and each non-volatile memory unit of the first plurality of non-volatile memory units;

a second plurality of non-volatile memory units, each non-volatile memory unit comprising a non-volatile memory die;

second routing circuitry, wherein the first ring bus is further connected to the second routing circuitry; and a third ring bus extending from the second routing circuitry that connects the second routing circuitry and each non-volatile memory unit of the second plurality of non-volatile memory units;

wherein the first routing circuitry is configured to:

configure, based on a configuration command from the ring bus controller, the first routing circuitry to route a command and a first set of data on the first ring bus to the second ring bus; and receive, after configuring the first routing circuitry based on the configuration command, the command and the first set of data on the first ring bus and route the command and the first set of data to the second ring bus extending from the first routing circuitry; and wherein the ring bus controller is further configured to:

route the first data set on the second ring bus to a non-volatile memory unit of the first plurality of non-volatile memory units; and while routing the first set of data on the second ring bus, route a second set of data on the third ring bus to a non-volatile memory unit of the second plurality of non-volatile memory units.

11. The memory module of claim 10, wherein the ring bus controller is configured to monitor data traffic on the first ring bus and the second ring bus.

12. The memory module of claim 10, wherein the ring bus controller is further configured to:

route the first set of data on the second ring bus to a first memory unit of the plurality of non-volatile memory units; and while routing the first set of data to the first non-volatile memory unit, route a second set of data from the first non-volatile memory unit to a second non-volatile memory unit of the plurality of non-volatile memory units on the second ring bus.

13. The memory module of claim 12, wherein the ring bus controller is further configured to:

store the first set of data in a non-volatile memory die of the first non-volatile memory unit; and while storing the first set of data in the non-volatile memory die of the first non-volatile memory unit, store the second set of data in a non-volatile memory die of the second non-volatile memory unit.

14. The memory module of claim 12, wherein the ring bus controller is further configured to:

store the first set of data in a non-volatile memory die of the first non-volatile memory unit; and while storing the first set of data in the non-volatile memory die of the first non-volatile memory unit, read a third set of data from a non-volatile memory die of the second non-volatile memory unit.

15. The method of claim 10, wherein the ring bus controller is configured to:

store the first set of data in a non-volatile memory die of the non-volatile memory unit of the first plurality of non-volatile memory units; and while storing the first set of data in the non-volatile memory die of the non-volatile memory unit of the first plurality of non-volatile memory units, store the second set of data in a non-volatile memory die of the non-volatile memory die of the second plurality of non-volatile memory units.

16. The method of claim 10, wherein the ring bus controller is further configured to:

store the first set of data at the non-volatile memory unit of the first plurality of non-volatile units; and while storing the first set of data at the non-volatile memory unit of the first plurality of non-volatile units, read a third set of data from the non-volatile memory unit of the second plurality of non-volatile memory units.

17. The memory module of claim 10, wherein at least one of the non-volatile memory unit on the second ring bus and the non-volatile memory unit on the third ring bus comprises a silicon substrate and a plurality of memory cells forming at least two memory layers vertically disposed with respect to each other to form a monolithic three-dimensional structure, wherein at least one layer is vertically disposed with respect to the silicon substrate.

18. The memory module of claim 10, wherein the ring bus controller is positioned on the first ring bus.

19. The memory module of claim 10, wherein the ring bus controller is not positioned on the first ring bus or the second ring bus.

20. A memory module comprising:

a primary ring bus;

a ring bus controller positioned on the primary ring bus;

a first plurality of non-volatile memory units, each non-volatile memory unit comprising a memory die;

a secondary ring bus in communication with the primary ring bus via a first bus bridge, the secondary ring bus connecting each non-volatile memory unit of the first plurality of memory units;

a second plurality of non-volatile memory units, each non-volatile memory unit comprising a memory die; and a tertiary ring bus in communication with the secondary ring bus via a second bus bridge, the tertiary ring bus connecting each non-volatile memory unit of the second plurality of memory units;

wherein the ring bus controller is configured to direct the first bus bridge to route data between the primary ring bus and the secondary ring bus and is configured to direct the second bus bridge to route data between the secondary ring bus and the tertiary ring bus; and wherein the first bus bridge is configured to:

configure, based on a configuration command from the ring bus controller, the first bus bridge to route a command and a first set of data on the primary ring bus to the secondary ring bus; and receive, after configuring the first bud bridge based on the configuration command, the command and the first set of data on the primary ring bus and route the command and the first set of data to the secondary ring bus; and wherein the ring bus controller is further configured to:

route the first data set on the secondary ring bus to a non-volatile memory unit of the first plurality of non-volatile memory units; and while routing the first set of data on the secondary ring bus, route a second set of data on the tertiary ring bus to a non-volatile memory unit of the second plurality of non-volatile memory units.

* * * * *